United States Patent
Peterson

(10) Patent No.: US 9,392,044 B2
(45) Date of Patent: Jul. 12, 2016

(54) SYSTEM AND METHOD FOR PROVIDING GEOSPATIAL ASSETS

(71) Applicant: Google Inc., Mountain View, CA (US)

(72) Inventor: Bret Peterson, Lafayette, CA (US)

(73) Assignee: Google Inc., Mountain View, CA (US)

(\*) Notice: Subject to any disclaimer, the term of this patent is extended or adjusted under 35 U.S.C. 154(b) by 128 days.

(21) Appl. No.: 13/924,886

(22) Filed: Jun. 24, 2013

(65) Prior Publication Data

US 2014/0379850 A1    Dec. 25, 2014

(51) Int. Cl.
| | |
|---|---|
| G06F 15/16 | (2006.01) |
| H04L 29/08 | (2006.01) |
| G06F 17/30 | (2006.01) |
| H04W 4/02 | (2009.01) |

(52) U.S. Cl.
CPC .......... *H04L 67/02* (2013.01); *G06F 17/30241* (2013.01); *H04L 67/18* (2013.01); *H04W 4/028* (2013.01)

(58) Field of Classification Search
CPC ............................ H04L 290/08; H04L 67/02
USPC ........................................................ 709/217
See application file for complete search history.

(56) References Cited

U.S. PATENT DOCUMENTS

| | | | |
|---|---|---|---|
| 7,450,003 B2 | 11/2008 | Weber et al. | |
| 7,873,697 B2 | 1/2011 | Goldstein et al. | |
| 8,068,849 B2 * | 11/2011 | Manson et al. | ............ 455/456.1 |
| 8,385,964 B2 | 2/2013 | Haney | |
| 8,739,123 B2 | 5/2014 | Appleton et al. | |
| 2006/0242111 A1 | 10/2006 | Goldstein | |
| 2008/0307498 A1 | 12/2008 | Johnson et al. | |
| 2011/0205229 A1 | 8/2011 | Jagadev et al. | |
| 2012/0038633 A1 | 2/2012 | Clark et al. | |
| 2013/0238599 A1 | 9/2013 | Burris | |

OTHER PUBLICATIONS

Related U.S. Appl. No. 13/483,215, filed Apr. 23, 2013.
Maria Andreia F. Rodrigues, Rafael G. Barbosa and Nabor C. Mendonca, Interactive Mobile 3D Graphics for On-the-go Visualization and Walkthroughs, Dated 2006, 6 pages.

\* cited by examiner

*Primary Examiner* — Adnan Mirza
(74) *Attorney, Agent, or Firm* — Dority & Manning, P.A.

(57) ABSTRACT

In one aspect, a method for providing geospatial assets is disclosed. The method may include receiving, from a local computing device, event data associated with a user, determining a predicted region of interest for the user based on the event data, generating a portable geospatial asset based on the predicted region of interest and transmitting the portable geospatial asset to the local computing device.

18 Claims, 5 Drawing Sheets

SYSTEM AND METHOD FOR PROVIDING GEOSPATIAL ASSETS

FIELD

The present subject matter relates generally to a system and method for providing geospatial assets and, more particularly, to a system and method for predicting which geographic region may be of interest to a user and generating a portable geospatial asset based on the predicted geographic region-of-interest.

BACKGROUND

Geographic Information Systems (GIS) clients capture, store, manage and display data elements according to geospatial coordinates. For example, mapping clients, such as Google Maps, render maps, satellite imagery and other data over a two-dimensional surface. Similarly, earth-browsing clients, such as Google Earth, render satellite imagery, terrain, vectors and other data over a three-dimensional geometry representing the Earth's surface. Thus, a user of Google Maps or Google Earth may navigate across the two-dimensional surface or three-dimensional geometry while data and images corresponding to geographical locations are presented to the user.

To provide for such a user experience, an enormous amount of geospatial data must be organized and indexed into geospatial assets, such as 2-D maps or 3-D globes. Typically, users rely on access to a central or master server(s) to provide this geospatial data to their mapping or earth-browsing clients. However, it is often the case that access to such master server(s) is not available, thereby limiting or preventing a user from retrieving the desired geospatial data.

SUMMARY

Aspects and advantages of the invention will be set forth in part in the following description, or may be obvious from the description, or may be learned through practice of the invention.

In one aspect, the present subject matter is directed to a method for providing geospatial assets. The method may include receiving, from a local computing device, event data associated with a user, determining a predicted region of interest for the user based on the event data, generating a portable geospatial asset based on the predicted region of interest and transmitting the portable geospatial asset to the local computing device.

In another aspect, the present subject matter is directed to a system for providing geospatial assets. The system may include a computing device having a processor and associated memory. The memory may store instructions that, when executed by the processor, configure the computing device to receive, from a local computing device, event data associated with a user, determine a predicted region of interest for the user based on the event data, generate a portable geospatial asset based on the predicted region of interest and transmit the portable geospatial asset to the local computing device.

Other exemplary aspects of the present subject matter are directed to apparatus, computer-readable media, devices and other systems and/or methods for providing geospatial assets to users of GIS clients.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
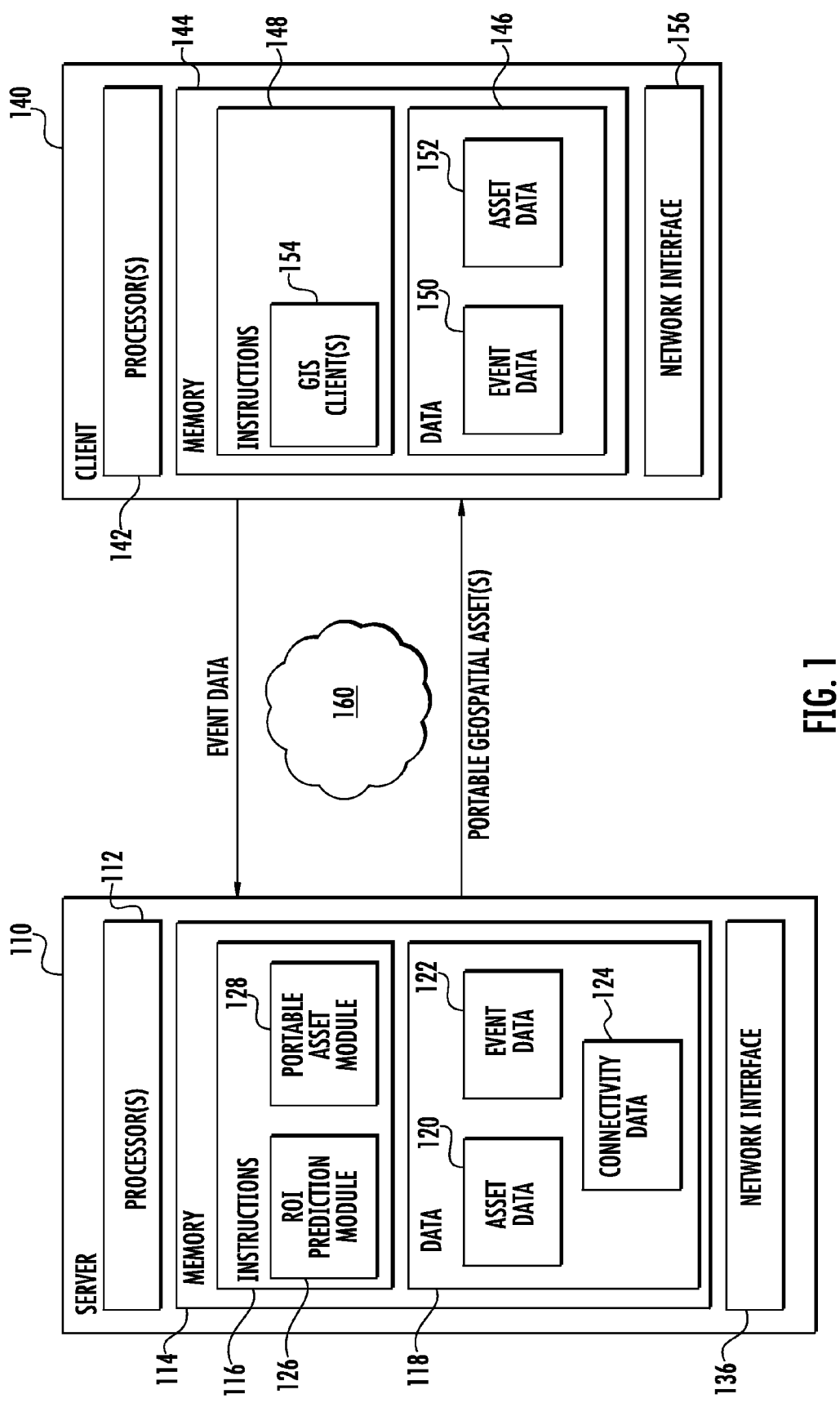
FIG. 1 illustrates a schematic view of one embodiment of a system for providing geospatial assets in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for providing geospatial assets to a user of a Geographic Information System (GIS) client. Specifically, in several embodiments, the disclosed system and method may be configured to collect event data made available by the user, such as calendar information, meeting schedules, delivery routes, travel itineraries and/or the like. This data may then be utilized to predict when and where specific geospatial data may be of interest to the user. Thereafter, the system may generate a portable geospatial asset(s) (e.g., a 3-D globe(s) or a 2-D map(s)) that includes the predicted geospatial data. The portable geospatial asset(s) may then be downloaded onto the user's device and accessed by the user. Thus, the disclosed system and method may allow for automating the generation and transmission of geospatial assets based on event data received from a user.

As is generally understood, high resolution, master geospatial assets including large amounts of data may be served to GIS clients by a dedicated server(s). However, a client device may not always have access to the server(s) (e.g., due to a lack of network connectivity) or the user of such device simply may not want to download such large geospatial assets (e.g., due to data restrictions). Thus, in accordance with aspects of the present subject matter, the disclosed system may be configured to cut portable geospatial assets from master geospatial assets that correspond to smaller subsets of data. For example, as indicated above, the portable geospatial assets may include geospatial data that the system has predicted may be of interest to the user based on his/her event data. The portable geospatial asset(s) may then be downloaded and served locally on the user's device without requiring network access to the server(s). For instance, a portable geospatial asset may be generated and downloaded to a user's device each night that includes geospatial data related to the specific events occurring the next day, such as by downloading a 2-D map including a driving directions layer with driving routes to each destination to which the user is traveling the next day. The user may then access such portable asset regardless of whether he/she has network connectivity. Alternatively, for a user that is traveling for an extended period of time (e.g., a week), a portable geospatial asset may be generated and downloaded to the user's device that includes geospatial data encompassing all events occurring during such time period.

In several embodiments, the event data collected from the user may be geocoded (i.e., by having geographic coordinates associated therewith). As such, the system may be able to determine an exact geographic location associated with the event data. However, for event data that is not geocoded, the disclosed system may be configured to predict a region-of-interest (ROI) that, based on the data, appears to encompass the geographic region that may be of interest to the user. In doing so, the context of the event data may be analyzed to determine various characteristics of the predicted ROI. For instance, if the event data indicates that a user is traveling to various locations within a city, the predicted ROI may correspond to a polygon encompassing all or a portion of the city (e.g., a circular area having a 10 mile radius centered at the city center). Alternatively, if the event data indicates that a user is traveling to a specific address or building, the predicted ROI may correspond to a smaller polygon centered at the address or building (e.g., a circular area having a 1 mile radius centered at the address/building). Similarly, if the event data indicates that a user is traveling between two locations separated by a significant distance (e.g. a user that is driving or flying across the country), the predicted ROI may include a first polygon centered at the user's starting point and a second polygon centered at the user's travel destination, with the polygons being connected by polylines encompassing the suggested travel route between the two locations. In such instance, the associated portable asset may be generated such that the geographic region corresponding to the portion of the predicted ROI defined by the polylines may be capable of being rendered at a higher resolution if the event data indicates that the user is traveling by car as opposed to an airplane. For instance, a road map layer may be included within the portable geospatial asset at a higher resolution when the user is traveling by car.

In addition, network connectivity data may also be utilized to determine various characteristics of the predicted ROI and/or the associated portable geospatial asset. For instance, if it is determined that a user will have network access while traveling except for when he/she travels through one or more specific geographic regions, the predicted ROI may be selected to cover such geographic regions. In such instance, a portable geospatial asset may be downloaded to the user's device that includes geospatial data associated with the geographic regions lacking network connectivity. The GIS client running on the user's device may then dynamically switch from using network geospatial assets (i.e., assets served over the network from the dedicated server(s)) to using the portable geospatial asset when network service is inadequate.

As used herein, the term "geospatial asset" generally refers to any data that may be rendered or otherwise used by a GIS client, such as 2-D maps, 3-D globes, geospatial search data, updates to existing geospatial data and/or the like. In addition, the term "geospatial asset" may also include a GIS client, itself, such as an earth-browsing client or a mapping client or any other suitable client configured to utilize geospatial data. As is generally understood, a 2-D map may correspond to geospatial data that has been organized and indexed such that the data may be rendered over a two-dimensional surface. Similarly, a 3-D globe may generally correspond to geospatial data that has been organized and indexed such that the data may be rendered over a three-dimensional geometry representing the Earth's surface. For example, in one embodiment, a 3-D globe may be a directory hierarchy containing a number of packet bundles or files that may be used to serve imagery, terrain and vectors to an earth-browsing client. In such an embodiment, the 3-D globe may be a master globe including imagery, terrain and vector data or a portable globe including a smaller subset of the imagery, terrain and vector data forming the master globe. For instance, it should be appreciated that specific imagery, terrain and vector data (corresponding to, for example, a specific geographical region(s) of a 3-D globe) may be cut or selected from one 3-D globe and organized/indexed to form a different 3-D globe. Similarly, smaller subsets of the data forming a particular 2-D map may also be selected and organized/indexed to form a different 2-D map.

In situations in which the systems and methods described herein access and analyze personal information about users, or make use of personal information, such as email data, calendar data and other forms of event data, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Referring now to the drawings, FIG. 1 illustrates one embodiment of a system 100 for providing geospatial assets in accordance with aspects of the present subject matter. As will be described below, the system 100 may allow for one or more geographic regions-of-interest (ROIs) to be predicted based on event data received from a client device. The predicated ROI(s) may then be used to generate one more portable geospatial assets that can be transmitted to the client device for subsequent display/use by a user.

The system 100 may include a client-server architecture where a server 110 communicates with one or more clients, such as a local client device 140, over a network 160. The server 110 may generally be any suitable computing device(s), such as a web server(s). Similarly, the client device 140 may generally be any suitable computing device(s), such as a laptop(s), desktop(s), smartphone(s), tablet(s), mobile device(s), wearable computing device(s) and/or any other computing device(s). Although a single client device 140 is shown in FIG. 1, it should be appreciated that any number of clients may be connected to the server 110 over the network 160.

In several embodiments, the server 110 may host a GIS, such as a mapping application (e.g. the Google Maps mapping services provided by Google Inc.), a virtual globe application (e.g. the Google Earth virtual globe application provided by Google Inc.), or any other suitable geographic information system. On the client-side, the client device 140 may present a user interface that allows a user to interact with the GIS. For instance, the user interface may be served through a network or web-based application that is executed on the client device 140, such as a web browser, a thin client application or any other suitable network or web-based application or the user interface may be served locally on the client device 140. The server 110 may transmit data, such as a geospatial asset(s) and other data, over the network 160 to the client device 140. Upon receipt of this data, the client device 140 may present the geospatial asset(s), via the user interface, in a display device associated with the client device 140. A user may then access and/or interact with the geospatial asset presented in the user interface.

As shown in FIG. 1, the client device 140 may include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases.

For instance, the data 146 may include an event database 150 storing event data. In several embodiments, the event data may be associated with one or more travel-related events. As used herein, a "travel-related event" may generally refer to any instance in which a user is traveling between two locations using any suitable means of travel, such as by walking, driving or flying between two locations. Thus, event data may include, but is not limited to, any information related to a travel-related event(s), such as the location(s) and/or the date(s)/time(s) associated with the travel-related event(s). For instance, event data may include a specific address, building name, GPS coordinate(s), city, country and/or the like that relates directly to the destination (and/or starting point) of a travel-related event(s) or other information that relates indirectly to the destination (and/or starting point) of a travel-related event(s) (e.g., "Meet at Dave's House"). Similarly, event data may also include a specific time(s) and/or date associated(s) with the travel-related event(s), such as a time/date to leave for a destination and/or a time/date to arrive at such destination.

It should be appreciated that the event data may be derived from any information source available to the client device 140, such as information received by, accessible to and/or created using client applications running on the device 140 and/or information accessible to the client device 140 over the network or using any other suitable information source. For instance, the event data may be associated with calendar and/or email applications, time management/scheduling applications, travel applications and/or any other suitable computer-related applications running on the device 140. Thus, event data may be collected from calendar entries, meeting invites, delivery schedules, travel itineraries and/or the like that are stored within and/or are otherwise accessible to the client device 140.

Additionally, in several embodiments, the data 146 stored within the memory 144 may include an asset database 152 storing asset data associated with one or more geospatial assets, such as one or more 3-D globes, 2-D maps and/or any other suitable geospatial assets (e.g., search data). As will be described below, such geospatial asset(s) may correspond to one or more portable geospatial assets transmitted to the client device 140 from the server 100.

Additionally, the instructions 148 stored within the memory 144 of the client device 140 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry. In several embodiments, suitable instructions may be stored within the memory 144 for implementing one or more GIS clients 154, such as one or more earth-browsing clients and/or mapping clients, designed to render geospatial assets. For instance, the GIS client(s) 154 may be configured to retrieve geospatial assets from the server 110 and render such assets for display/use by the user. In addition, the GIS client(s) 154 may also be configured to render geospatial assets stored within the device's memory 144, such as portable geospatial assets stored within the asset database 152.

Moreover, as shown in FIG. 1, the client device 140 may also include a network interface 156 for providing communications over the network 160. In general, the network interface 156 may be any device/medium that allows the client device 140 to interface with the network 160.

Similar to the client device 140, the server 110 may also have a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases. For instance, as shown in FIG. 1, the memory 114 may include an asset database 120 for storing asset data associated with one or more geospatial assets, such as one or more master geospatial assets (e.g., a master 3-D globe and/or a master 2-D map), and an event database 112 for storing event data collected from the client device 140.

Additionally, the memory 114 may include a network connectivity database 124 storing data associated with network connectivity. In several embodiments, such connectivity data may be transmitted to the server 110 from the client device 140. For instance, a user may identify geographic regions in which network connectivity is poor or lacking and transmit data associated with such geographic regions to the server 110. Alternatively, the connectivity data may be derived from any other source. For example, the connectivity data may be retrieved from network providers (e.g., cellular network coverage maps), other users and/or any other suitable sources and thereafter stored within the network connectivity database 124.

As shown in FIG. 1, in several embodiments, the instructions 116 stored within the memory 114 may be executed by the processor(s) 112 to implement a ROI prediction module 126. In general, the ROI prediction module 126 may be configured to analyze the event data received from the client device 140 to predict which geographic ROI(s) may be of interest to a user. For instance, if analysis of the event data indicates that a user may be traveling to a particular city, it may be predicted that a geographic ROI encompassing all or a portion of such city may be of interest to the user. Additionally, as will be described below, by analyzing the context of the event data, various context-based characteristics of the predicted ROI(s) may also be determined, such as the location, size and/or shape of the ROI(s). Moreover, characteristics of the predicted ROI(s) may also be determined based on supplementary data provided to the server 110 from the client device 140 and/or obtained by the server 110 via any other suitable means. For instance, network connectivity data stored within the server 110 may be utilized to determine one or more characteristics of the predicted ROI(s).

As indicated above, it should be appreciated that a user may be allowed to select which and to what extent event data is capable of being collected from his/her device 140 by the server 110. For instance, a user may be provided the option of manually selecting and transmitting event data to the server 110. Alternatively, the user may be provided the option to select certain data sources on his/her device 140 from which event data may be automatically collected by the server 110 (e.g., by selecting particular computer-related applications, such as calendar and/or email applications, from which the event data may be collected).

Additionally, as shown in FIG. 1, the instructions 116 stored within the memory 114 may also be executed by the processor(s) 112 to implement a portable asset module 128. In general, the portable asset module 128 may be configured to generate a portable geospatial asset based on the predicted ROI provided by the ROI predicted module 126. As will be described below, each portable geospatial asset may correspond to a data subset of a master geospatial asset. For instance, if the server 110 is configured to serve 3-D globes, a master globe may be stored within the asset database 120 that corresponds to a high resolution, multi-level globe including geospatial data, such as imagery, terrain and vector data, that has been fused together to create a large, navigable globe. Thus, a portable globe may be created, for example, by cutting or removing certain geospatial data from the master globe to provide a new, smaller globe. Specifically, in one embodiment, the portable globe may be created by copying all of the geospatial data from the master globe for the geographic region corresponding to the predicted ROI while disregarding portions of the geospatial data for other geographic regions. As such, the geographic region within the portable globe corresponding to the predicted ROI may, for example, be rendered at high resolutions whereas other geographic regions may be rendered at low resolutions. Similarly, if the server 110 is configured to serve 2-D maps, a master map may be stored within the asset database 120 and used as the basis for creating smaller, portable maps.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Additionally, as shown in FIG. 1, the server 110 may also include a network interface 130 for providing communications over the network 160. Similar to the interface for the client device 140, the network interface 130 may generally be any device/medium that allows the server 110 to interface with the network 160.

It should be appreciated that the network 160 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 2:
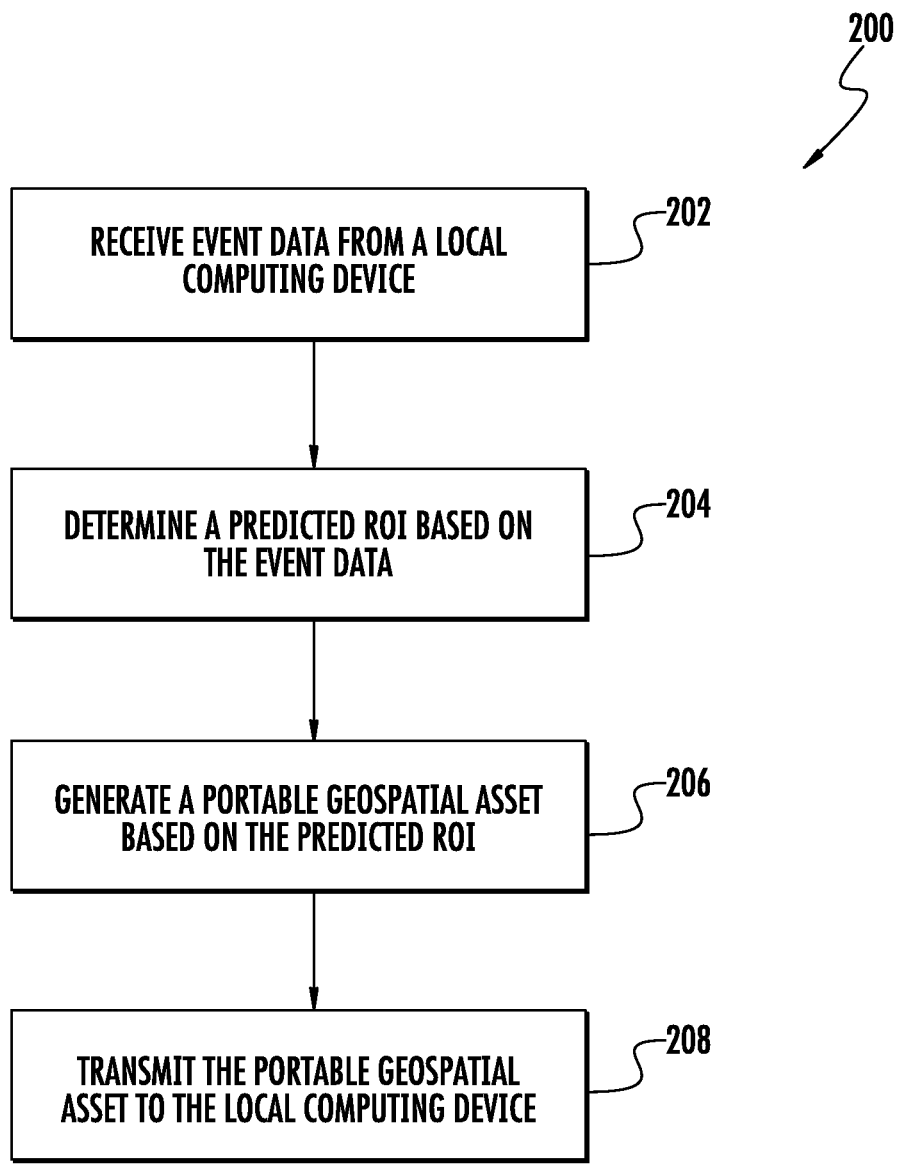
FIG. 2 illustrates a flow diagram of one embodiment of a method for providing geospatial assets in accordance with aspects of the present subject matter.

Referring now to FIG. 2, a flow diagram of one embodiment of a method 200 for providing geospatial assets is illustrated in accordance with aspects of the present subject matter. In general, the method 200 will be described herein with reference to the system 100 shown in FIG. 1. However, those of ordinary skill in the art, using the disclosures provided herein, should appreciate that the methods described herein may be executed by any computing device or any combination of computing devices. Additionally, it should be appreciated that, although method elements are shown in FIG. 2 in a specific order, the various elements of the disclosed method 200 may generally be performed in any suitable order that is consistent with the disclosure provided herein.

At (202), the method 200 includes receiving event data from a local computing device, such as the local client device 140 of FIG. 1. For instance, as indicated above, event data stored within and/or accessible to the client device 140 may be transmitted to the server 110. Such event data may include, for example, any information associated with a travel-related event(s) of a user, such as the location(s) and/or the date(s)/time(s) associated with the travel-related event(s).

At (204), the method 200 includes determining a predicted ROI based on the event data. Specifically, in several embodiments, the ROI prediction module 126 may analyze the event data to predict which geographic ROI(s) may be of interest to the user. In doing so, the ROI prediction module 126 may be configured to assess the context of the event data to determine one or more context-based characteristics for the predicted ROI.

Specifically, in several embodiments, the context of the event data may be utilized to determine a geographic location for the predicted ROI. For example, if the event data includes the textual string "Meet Tara at Times Square for New Year's Eve," it may be predicted that the text is referring to Times Square in New York City, particularly given the reference to New Year's Eve. As such, the geographic region associated with the predicted ROI may include all or a portion of New York City, such as by centering the geographic region at Times Square in New York City.

Figure 3:
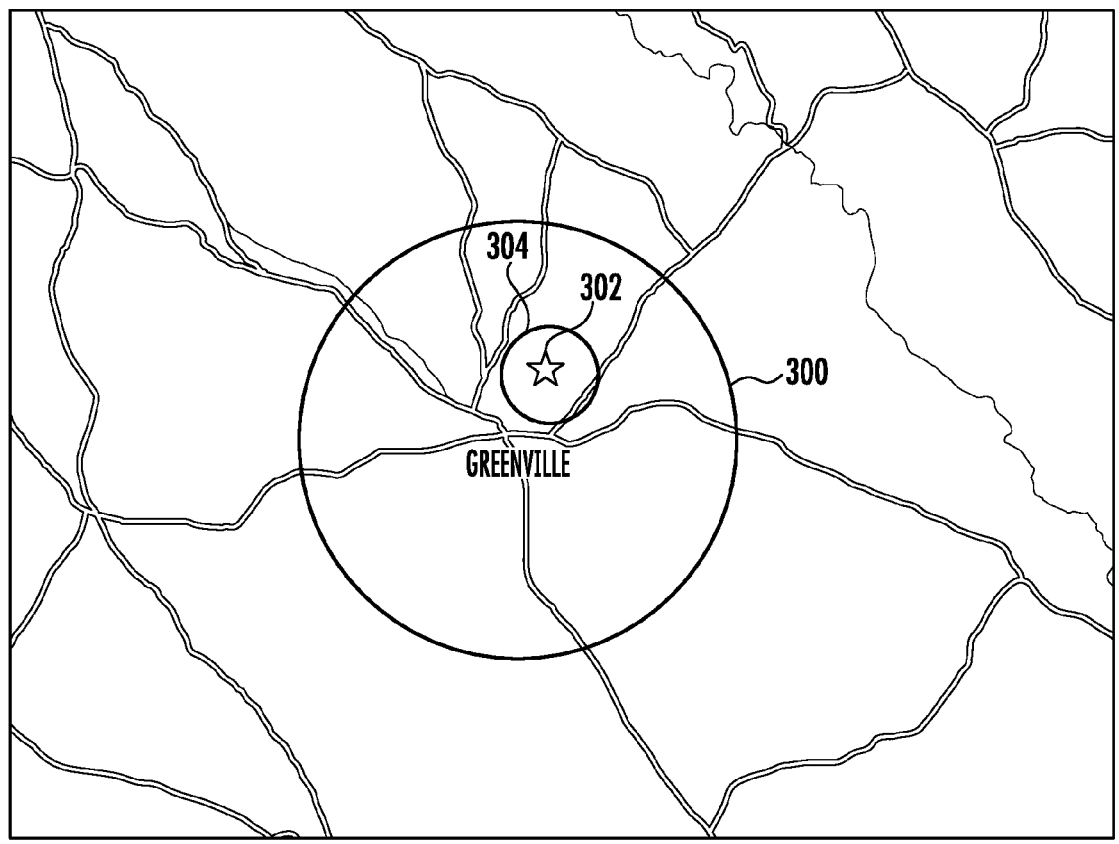
FIG. 3 illustrates an example view of a geographic region displayed within a geospatial asset, particularly illustrating example predicted ROIs outlined within the geospatial asset.

Additionally, the context of the event data may be utilized to determine a size for the predicted ROI. For instance, if the event data provides an indication that a user is traveling to a particular city but does not indicate to what location within the city, the predicted ROI may be relatively large so as to encompass all or a portion of the city and its surrounding area (e.g., surrounding suburbs). Alternatively, if the event data indicates that the user is traveling to a particular location within the city (e.g., a particular address or building), the predicted ROI may be relatively small so as to only capture the sections of the city around such location. For instance, FIG. 3 illustrates a simplified view of an example geospatial asset in which predicted ROIs have been identified based on the context of the event data transmitted from the client device 140. As shown, for event data simply indicating travel to a particular city (e.g., the city of "Greenville"), the predicted ROI may be defined, for example, within a circle 300 have a large radius (e.g., a 10 mile radius) centered at the city center. However, for event data indicating travel to a specific location within the city (indicated at point 302), the predicted ROI may be defined within a circle 304 having a small radius (e.g., a 1 mile radius) centered at the specific location 302.

Figure 4:
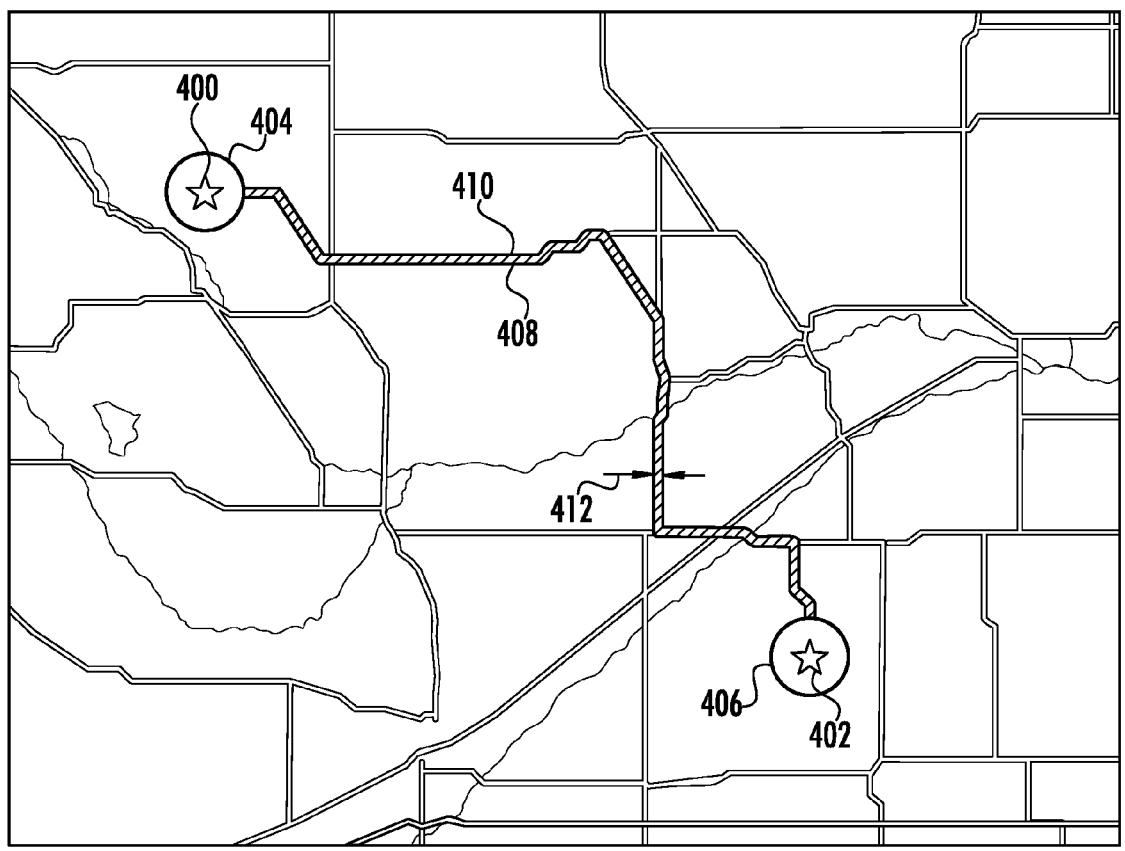
FIG. 4 illustrates another example view of a geographic region displayed within a geospatial asset, particularly illustrating an example predicted ROI outlined within the geospatial asset.

Moreover, the context of the event data may be utilized to determine a shape for the predicted ROI. For instance, similar to that shown in FIG. 3, if the event data simply indicates a travel destination for the user, the shape of the predicted ROI may be selected to encompass such travel destination, such as by defining the ROI using a circle, square or any other suitable polygon centered at the travel destination. Alternatively, the shape of the predicted ROI may be more complex. For example, if the event data indicates that the user is traveling between two separate locations the shape of the predicted ROI may be selected to encompass both locations as well as a suggested travel route between the locations. An example view of a geospatial asset including such a predicted ROI is illustrated in FIG. 4. As shown, assuming that the event data indicates that a user is traveling between a first location (indicated by point 400) and a second location (indicated by point 402), the predicted ROI may be defined by polygon shapes 404, 406 centered at both the first and second locations 400, 402. Additionally, polylines 408, 410 may extend from the first location 400 to the second location 402 that bound or define a suggested travel route between the two locations. In such an embodiment, a width 412 of the predicted ROI defined between the polylines 408, 401 may vary depending on the user's mode of travel. For instance, if the event data indicates that the user is traveling by car between the first and second locations 400, 402, the width 412 may be relatively narrow, such as by selecting the width so that the polylines 408, 410 bound the road(s) included within the suggested travel route by a given distance (e.g., 25 meters along either side). However, if the event data indicates that the user is traveling by airplane between the first and second locations 400, 402, the width 412 may be much broader to encompass various potential flight paths for the airplane.

Figure 5:
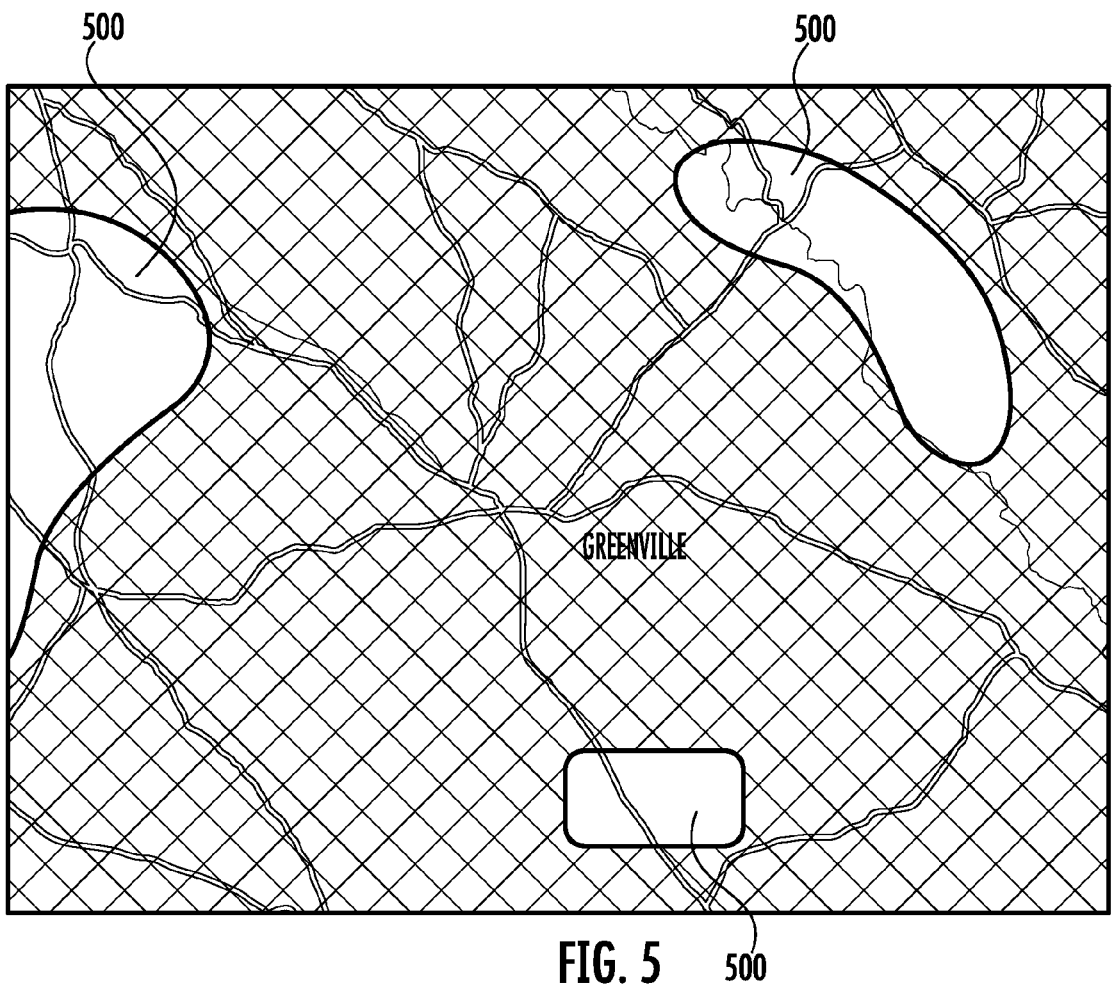
FIG. 5 illustrates yet another example view of a geographic region displayed within a geospatial asset, particularly illustrating areas within the geographic region that lack or otherwise have poor network connectivity.

As described above, network connectivity data available to the server 110 may also be utilized to determine one or more characteristics of the predicted ROI. For instance, FIG. 5 illustrates a coverage map providing an example of the network connectivity within a geographic region, with the portions of the region that are network accessible being represented by cross-hatching and the portions that lack connectivity or have poor connectivity being represented as open areas 500. As shown, the geographic region includes several areas 500 that have connectivity issues. In such instance, if the event data indicates that a user is to be traveling within such geographic region, a predicted ROI may be selected for each area 500 that lacks or has poor connectivity, such as by selecting the boundaries of the ROI(s) to correspond to the boundary of each open area 500 (indicated by the bold lines).

Referring back to FIG. 2, at (206), the method 200 may include generating a portable geospatial asset based on the predicted ROI. For instance, in several embodiments, the portable geospatial asset may be generated such that the geographic region encompassed within the predicted ROI may be rendered at a higher resolution than other geographic regions not included within the predicted ROI. As indicated above, the geospatial data used to generate the portable geospatial asset may be derived from a master geospatial asset, with the portable asset corresponding to a data subset of the master asset. Thus, to provide for higher resolutions within the geographic region associated with the predicted ROI, all or a significant portion of the geospatial data contained within the master asset for such region may be included within the portable asset. In contrast, for geographic regions outside the predicted ROI(s), the portable asset may include a smaller portion of the geospatial data contained within the master asset for such other regions. Alternatively, the portable geospatial asset may be created so as to only include geospatial data associated with the predicted ROI.

It should be appreciated that each portable geospatial asset may be cut from its corresponding master geospatial asset or otherwise created based upon such master asset using any suitable means and/or method known in the art. For instance, U.S. Pat. Pub. No. 2011/0205229 (Jagadev et al.), filed on Feb. 23, 2010 and entitled "Portable Globe Creation For a Geographical Information System," the disclosure of which is hereby incorporated by reference herein for all purposes, discloses a system and method for creating portable geospatial assets based on a master geospatial asset and transferring such assets from a master server to a local computing device. Specifically, the disclosure utilizes a user-selected ROI to generate a portable asset that includes greater amounts of geospatial data for the user-selected ROI than for the remainder of the portable asset. A similar methodology may be used in accordance with aspects of the present subject matter to generate portable geospatial assets based on the predicted ROI(s), which may then be transmitted to the client device 140 for subsequent display/use by the user.

Similar to the predicted ROI, the context of the event data may be analyzed to determine one or more context-based characteristics for the portable geospatial asset. Specifically, in several embodiments, the context of the event data may be utilized to determine the resolution of the portable asset for the geographic area associated with the predicted ROI. For example, referring back to FIG. 4, if the event data indicates that the user will be driving between the first and second locations 400, 42, the portable geospatial asset may be generated such that the portion of the predicted ROI defined by the polylines 408, 410 may be rendered at a higher resolution than if the user was traveling by plane. Additionally, in one embodiment, the portable geospatial asset may be generated such that the portion of the predicted ROI defined around the first and second locations 400, 402 may be rendered at the highest resolution possible.

Additionally, the context of the event data may also be utilized to select which layers are included within the portable geospatial asset. For example, if the event data indicates that a user will be traveling to a building for which floor plans are available to the server 110, a floor plan layer may be included within the portable asset to the assist the user in navigating through the building. Such a layer may be particularly desirable when the building hosts a tourist attraction, such as a museum. Similarly, if the event data indicates that a user will be driving between two separate locations (e.g., similar to that shown in FIG. 4), a road map layer may be included within the portable asset that provides driving directions between such locations. Alternatively, if the event data indicates that a user will be flying between separate locations, an airport layer may be included within the portable asset for the departure airport and/or the arrival airport that provides information related to the airport(s), such as an airport layout including terminal locations, dining information, car rental locations and/or the like.

Moreover, the network connectivity data may also be utilized to determine one or more characteristics of the portable asset. For example, as indicated above with reference to FIG. 5, the event data may indicate that a user will be traveling within a geographic region that lacks and/or has poor network connectivity (e.g., areas 500). In such an embodiment, the portable asset may be generated such that the portions of the geographic region having poor and/or no connectivity may be rendered at higher resolutions than the portions of the region within which the user will have access to a network. Similarly, layer selection within the portable asset may also be impacted by the network connectivity data. For instance, if the event data indicates that a user is traveling between a first office building (which has a WiFi network available for downloading the building's floor plan) and a second office building (which has no WiFi connectivity), the portable asset may be generated such that a floor plan layer is included within the asset for the second office building.

In addition to (or as an alternative to) using the context of the event data and/or the network connectivity data, various other factors or parameters may be utilized to determine one or more characteristics of the portable asset. For instance, the size, resolution and/or any other suitable characteristics of the portable asset may be selected based on the available network bandwidth and/or the storage available on the client device 140. Specifically, if the available bandwidth and/or the available storage is low, the portable asset may be specifically tailored (e.g., based on size, resolution, etc.) to ensure both that the portable asset may be delivered to the client device 140 within a reasonable amount of time and that the asset may actually fit within the memory 144 of the device 140.

It should also be appreciated that, in addition to the geospatial data, the portable geospatial asset generated by the server 110 may also include portions or all of the event data received from the client device 140. For instance, event data may be displayed within the portable asset to show relevant locations and/or times associated with the data, such as by displaying the building name and/or meeting time within the portable asset adjacent to the geographic location to which a user is traveling for his/her meeting. In several embodiments, the event data may be displayed based on the current time so that the location/time of upcoming events is highlighted within the portable asset. In another embodiment, the event data may be displayed as a time slider to show events scheduled across a given time period. Alternatively, the event data may be displayed based on search results. For instance, the event data may be searchable within the portable asset based on any information associated with the data, such as location, time and/or content information.

Referring still to FIG. 2, at (208), the method 200 may include transmitting the portable geospatial asset to the local computing device, such as the client device 140. Specifically, once the portable asset has been generated by the server 110, the asset may be downloaded onto the client device 140 for subsequent use by the user. As indicated above, the portable assets may be generated and transmitted to the user periodically, such as on a daily or weekly basis. Alternatively, the portable assets may only be configured to be transmitted to the client device when such device has access to a particular network, such as a WiFi or LAN network.

It should be appreciated that, in addition to transmitting new portable geospatial assets to the client device 140, the server 110 may also be configured to transmit delta or update information that can be appended to existing portable assets stored within the client device 140. For instance, if a user travels within a specific geographic region often, an initial portable asset may be transmitted to the client device 140 that includes geospatial data related to such geographic region. Thereafter, update information may be transmitted to the client device (e.g., on a daily or weekly basis) to update the portable geospatial asset, such as by sending information related to upcoming or newly scheduled events.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for providing geospatial assets, the method comprising:
receiving, by one or more computing devices, event data associated with a user from a local computing device, the event data corresponding to location information associated with at least one travel-related event for the user that is expected to occur in the future;
determining, by the one or more computing devices, a predicted region of interest for the user based on the event data, the predicted region of interest corresponding to a geographical region of a master geospatial asset;
generating, by the one or more computing devices, a portable geospatial asset based on the predicted region of interest, the portable geospatial asset corresponding to a 2-D map or a 3-D globe that includes a data subset of the master geospatial asset; and
transmitting, by the one or more computing devices, the portable geospatial asset to the local computing device.

2. The method of claim 1, further comprising determining a context-based characteristic for the predicted region of interest based on the event data.

3. The method of claim 2, wherein the context-based characteristic corresponds to a geographic location of the predicted region of interest.

4. The method of claim 2, wherein the context-based characteristic corresponds to a size of the predicted region of interest.

5. The method of claim 2, wherein the context-based characteristic corresponds to a shape of the predicted region of interest.

6. The method of claim 1, further comprising determining a context-based characteristic for the portable geospatial asset based on the event data.

7. The method of claim 6, wherein the context-based characteristic corresponds to a resolution of the portable geospatial asset.

8. The method of claim 6, wherein the context-based characteristic corresponds to layer selection for the portable geospatial asset.

9. The method of claim 1, further comprising determining a characteristic for at least one of the predicted region of interest or the portable geospatial asset based on network connectivity data.

10. The method of claim 9, wherein a geographic location of the predicted region of interest is selected based on the network connectivity data.

11. The method of claim 9, wherein a resolution of the portable geospatial asset is selected based on the network connectivity data.

12. The method of claim 9, wherein an asset layer of the portable geospatial asset is selected based on the network connectivity data.

13. A system for providing geospatial assets, the system comprising:
a computing device including a processor and associated memory, the memory storing instructions that, when executed by the processor, configure the computing device to:
receive, from a local computing device, event data associated with a user, the event data corresponding to location information associated with at least one travel-related event for the user that is expected to occur in the future;
determine a predicted region of interest for the user based on the event data, the predicted region of interest corresponding to a geographical region of a master geospatial asset;
generate a portable geospatial asset based on the predicted region of interest, the portable geospatial asset corresponding to a 2-D map or a 3-D globe that includes a data subset of the master geospatial asset; and
transmit the portable geospatial asset to the local computing device.

14. The system of claim 13, wherein the controller is further configured to determine a context-based characteristic for the predicted region of interest based on the event data.

15. The system of claim 14, wherein the context-based characteristic corresponds to at least one of a geographic location, a size or a shape of the predicted region of interest.

16. The system of claim 13, wherein the controller is further configured to determine a context-based characteristic for the portable geospatial asset based on the event data.

17. The system of claim 16, wherein the context-based characteristic corresponds to at least one of a resolution of the portable geospatial asset or layer selection for the portable geospatial asset.

18. The system of claim 13, wherein the controller is further configured to determine a characteristic for at least one of the predicted region of interest or the portable geospatial asset based on network connectivity data.

* * * * *